(12) United States Patent
Olah

(10) Patent No.: US 11,781,282 B2
(45) Date of Patent: Oct. 10, 2023

(54) LOCKING T-BOLTS, POST SLEEVES, POST SLEEVES WITH SHEAR CONNECTIONS, AND RELATED SYSTEMS AND METHODS

(71) Applicant: Simpson Strong-Tie Company, Inc., Pleasanton, CA (US)

(72) Inventor: Timothy J. Olah, Independence, MO (US)

(73) Assignee: Simpson Strong-Tie Company, Inc., Pleasanton, CA (US)

(*) Notice: Subject to any disclaimer, the term of this patent is extended or adjusted under 35 U.S.C. 154(b) by 238 days.

(21) Appl. No.: 16/824,284

(22) Filed: Mar. 19, 2020

(65) Prior Publication Data

US 2020/0299919 A1    Sep. 24, 2020

Related U.S. Application Data

(60) Provisional application No. 62/821,134, filed on Mar. 20, 2019.

(51) Int. Cl.
*E02D 27/42* (2006.01)
*E04H 12/22* (2006.01)
*F16B 37/04* (2006.01)

(52) U.S. Cl.
CPC ......... *E02D 27/42* (2013.01); *E04H 12/2253* (2013.01); *F16B 37/045* (2013.01)

(58) Field of Classification Search
CPC ... E02D 27/42; E04H 12/2253; F16B 37/045; F16B 7/0473; E04F 11/1859; E04F 11/1812; E04B 2/88; E04B 2/885
See application file for complete search history.

(56) References Cited

U.S. PATENT DOCUMENTS

| | | | | |
|---|---|---|---|---|
| 1,933,536 A * | 11/1933 | Awbrey | ............... | E04B 1/4135 52/708 |
| 3,483,910 A * | 12/1969 | Van Huffel | ........... | F16B 37/046 411/112 |
| 3,813,179 A * | 5/1974 | Priest | .................... | F16B 37/045 403/348 |
| 4,350,318 A * | 9/1982 | Gallis | ................... | E04G 17/042 249/219.2 |
| 4,830,531 A * | 5/1989 | Condit | .................. | F16B 37/045 403/348 |
| 5,199,836 A * | 4/1993 | Gogarty | ................ | F16B 37/045 411/104 |
| 6,336,623 B1 * | 1/2002 | McCarthy | ........... | E04G 21/3214 182/113 |
| 9,416,529 B1 * | 8/2016 | Jeske | ........................ | E04B 2/96 |
| 9,708,812 B2 * | 7/2017 | Jeske | ........................ | E04B 2/96 |
| 9,920,543 B2 * | 3/2018 | Budenbender | .......... | E04G 21/32 |
| 10,407,917 B1 * | 9/2019 | Bilge | ................... | E04F 13/0801 |

(Continued)

*Primary Examiner* — Adriana Figueroa
(74) *Attorney, Agent, or Firm* — Vierra Magen Marcus LLP

(57) ABSTRACT

A post sleeve including a first mounting plate including a first mounting hole. The post sleeve also can include a second mounting plate including a second mounting hole. The post sleeve additionally can include a channel portion extending between the first mounting plate and the second mounting plate. The channel portion can include a channel configured to secure a post within the channel. The first and second mounting plates can be configured to be attached to an anchor channel of an edge angle. Other embodiments are described.

20 Claims, 9 Drawing Sheets

(56) References Cited

U.S. PATENT DOCUMENTS

| | | | | |
|---|---|---|---|---|
| 2004/0041141 A1* | 3/2004 | Cannon | ............... | E04G 21/3223 256/65.05 |
| 2006/0145131 A1* | 7/2006 | Purvis | ................. | E04G 21/3223 256/13.1 |
| 2007/0094955 A1* | 5/2007 | Safford | ................. | E06B 3/5427 52/204.5 |
| 2008/0157046 A1* | 7/2008 | Murphy | ............. | E04G 21/3261 256/32 |
| 2010/0301297 A1* | 12/2010 | Chapman | ............ | E04G 21/3223 256/47 |
| 2012/0055102 A1* | 3/2012 | Fradera Pellicer | ... | E04B 1/4121 52/167.1 |

* cited by examiner

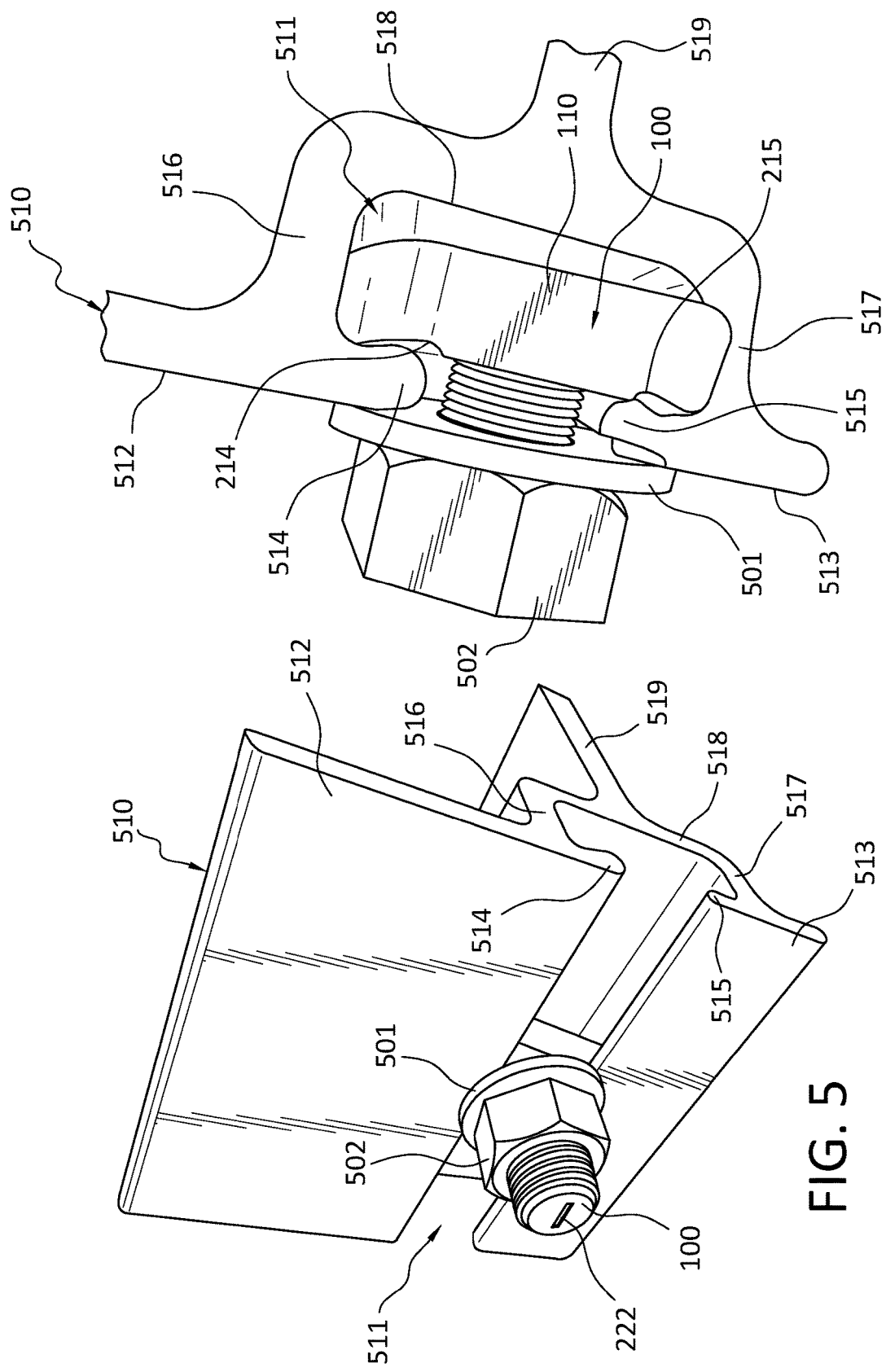

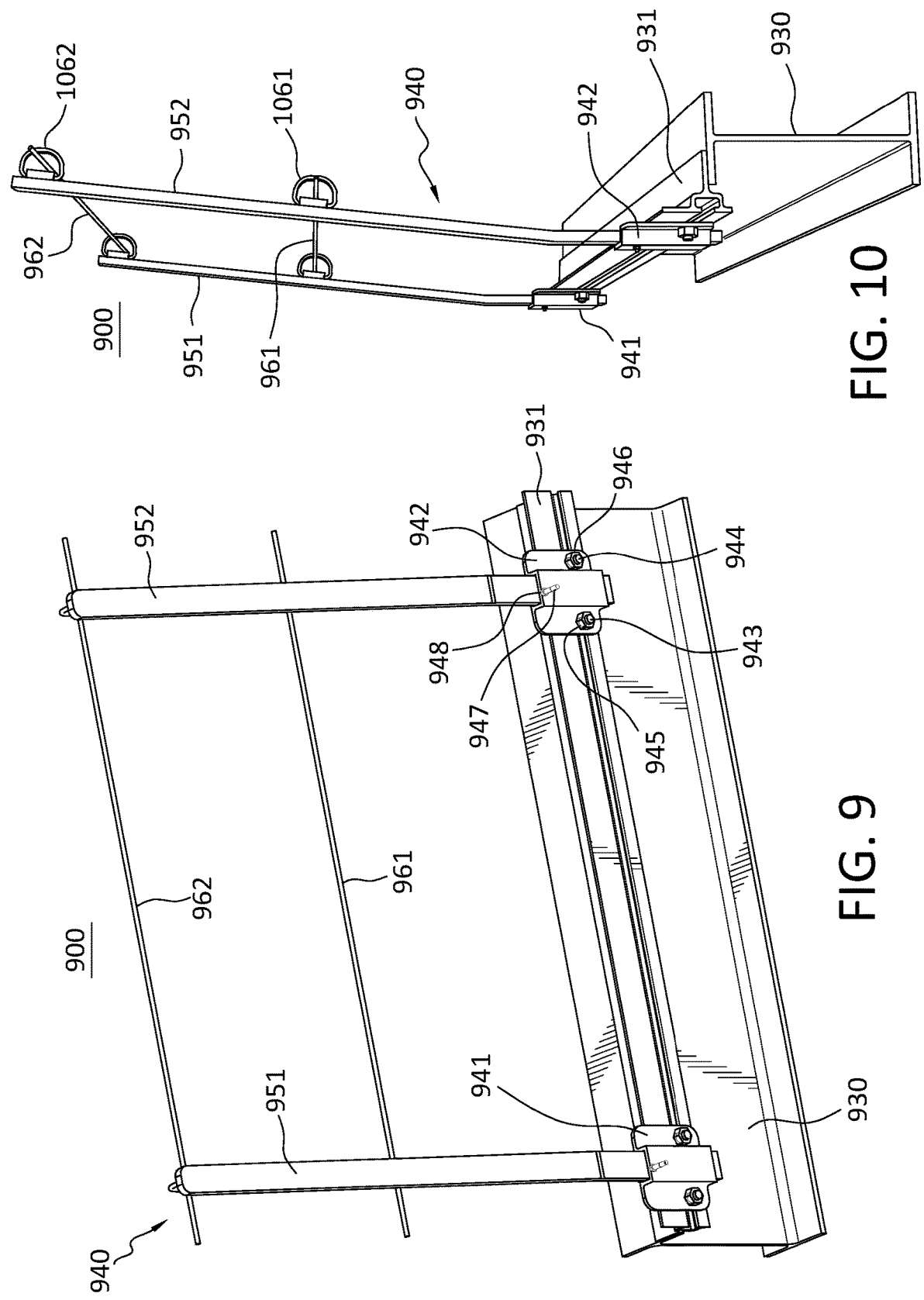

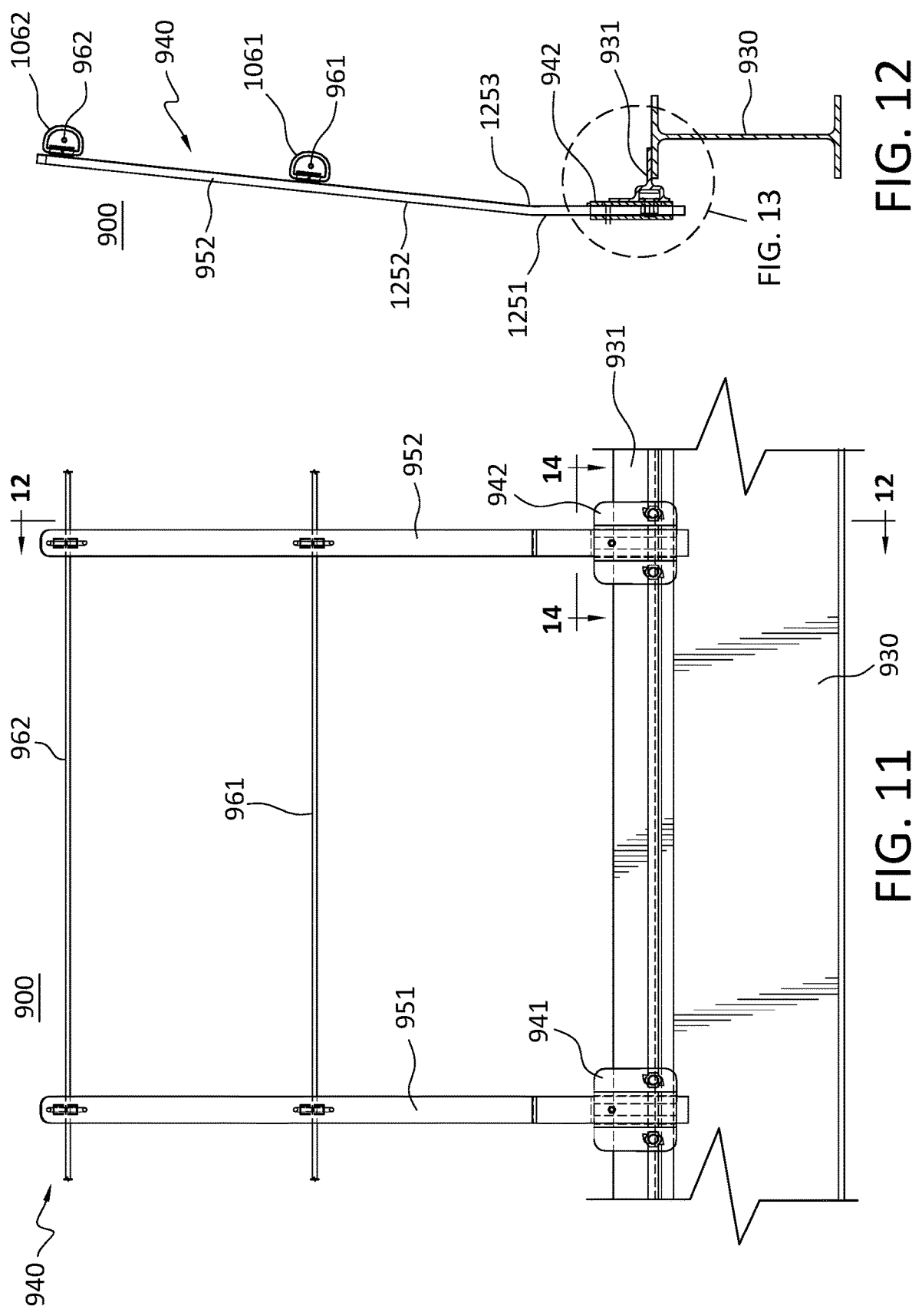

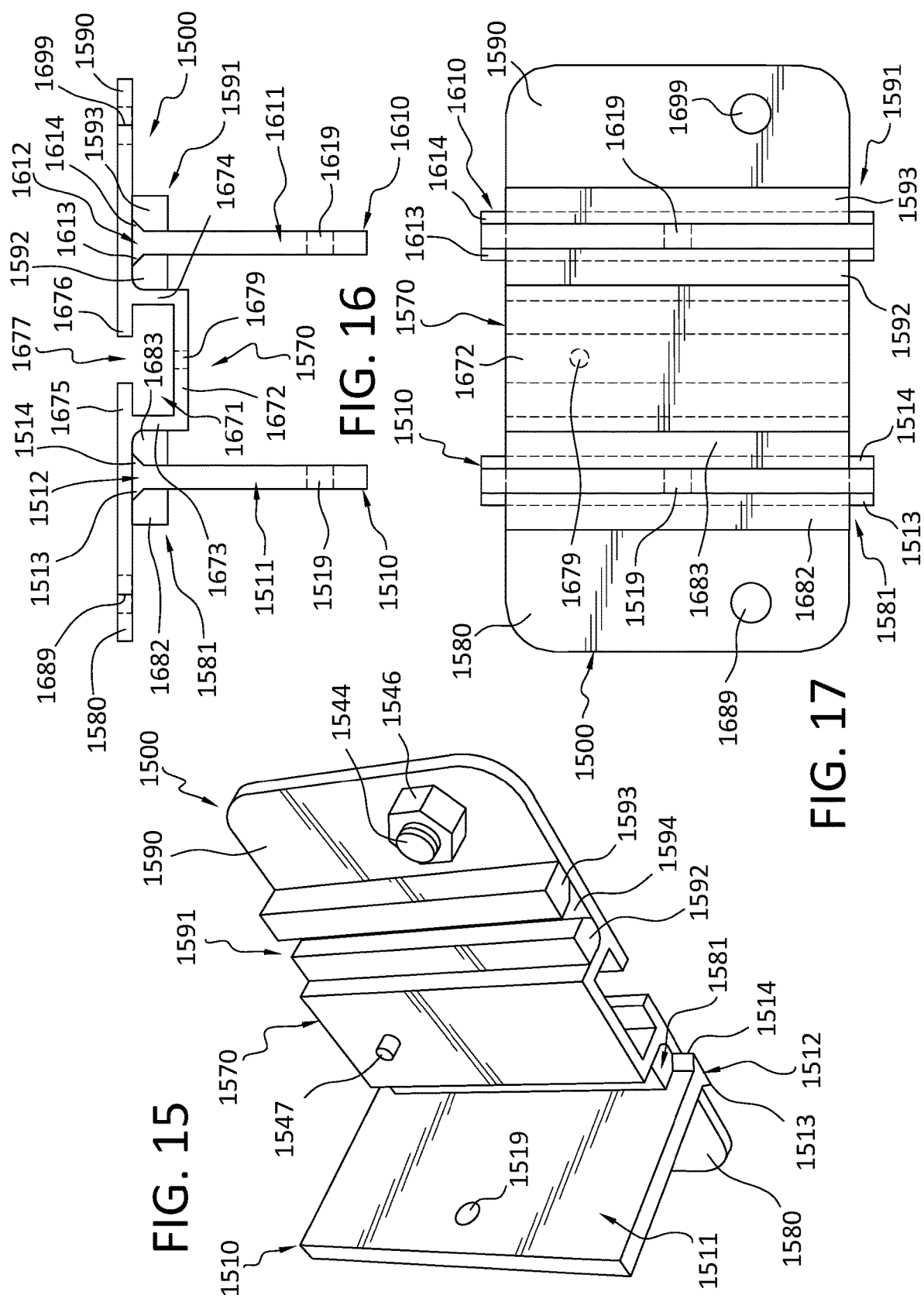

LOCKING T-BOLTS, POST SLEEVES, POST SLEEVES WITH SHEAR CONNECTIONS, AND RELATED SYSTEMS AND METHODS

CROSS-REFERENCE TO RELATED APPLICATION

This claims the benefit of U.S. Provisional Application No. 62/821,134, filed Mar. 20, 2019. U.S. Provisional Application No. 62/821,134 is incorporated herein by reference in its entirety.

TECHNICAL FIELD

This disclosure related generally to locking t-bolts, post sleeves, post sleeves with shear connections, and related systems and methods.

BACKGROUND

Conventional building construction techniques involve a bend steel plate, sometimes called an edge angle, which is welded to spandrel beams as pour stops for concrete. Curtain walls are the outer covering of a building and do not carry dead load weight from the building other than the dead load of the curtain wall itself. Typical curtain wall assemblies include structural members called mullions which separate and secure the curtain wall panels. The curtain wall is typically attached to the bent plate pour stop via clip angles welded to the pour stop or supporting beam.

BRIEF DESCRIPTION OF THE DRAWINGS

To facilitate further description of the embodiments, the following drawings are provided in which:

FIG. 5 illustrates a top, front, right side perspective view of an edge angle with the T-bolt of FIG. 1 attached in an anchor channel of the edge angle;

FIG. 6 illustrates a right side view of the edge angle of FIG. 5 with the T-bolt of FIG. 1 attached in the anchor channel of the edge angle of FIG. 5;

FIG. 9 illustrates a front, top, left side perspective view of a system, according to another embodiment;

FIG. 10 illustrates a front, top, right side perspective view of the system of FIG. 9;

FIG. 11 illustrates a front elevational view of the system of FIG. 9;

FIG. 12 illustrates a right side view along cross-sectional line 12-12 shown in FIG. 11, showing a post of FIG. 9 secured in a post sleeve of FIG. 9 to an edge angle of FIG. 9;

FIG. 15 illustrates a front, bottom, right side perspective view of a post sleeve with a shear tab connected to a slot assembly of the post sleeve, according to another embodiment;

FIG. 16 illustrates a bottom plan view of the post sleeve of FIG. 15 with the shear tab of FIG. 15 and another shear tab connected to the post sleeve of FIG. 15;

FIG. 17 illustrates a front elevation view of the post sleeve of FIG. 15 with the shear tab of FIG. 15 and the shear tab of FIG. 16 connected to the post sleeve of FIG. 15.

Figure 1:
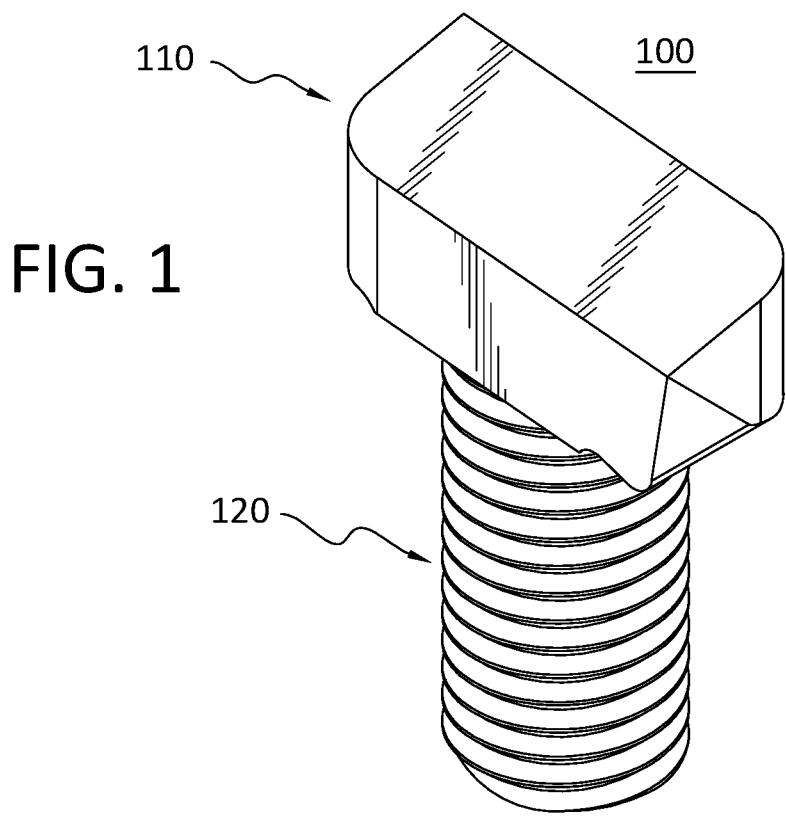
FIG. 1 illustrates a top, side perspective view of a T-bolt, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a post sleeve. The post sleeve can include a first mounting plate including a first mounting hole. The post sleeve also can include a second mounting plate including a second mounting hole, The post sleeve additionally can include a channel portion extending between the first mounting plate and the second mounting plate. The channel portion can include a channel configured to secure a post within the channel. The first and second mounting plates can be configured to be attached to an anchor channel of an edge angle.

Additional embodiments include a method. The method can include providing a post sleeve. The post sleeve can include a first mounting plate including a first mounting hole. The post sleeve also can include a second mounting plate including a second mounting hole. The post sleeve additionally can include a channel portion extending between the first mounting plate and the second mounting plate. The channel portion can include a channel configured to secure a post within the channel.

Further embodiments can include a method. The method can include attaching two or more post sleeves to an anchor channel of an edge angle. Each respective post sleeve of the two or more post sleeves can include a first respective mounting plate comprising a first respective mounting hole, a second respective mounting plate comprising a second respective mounting hole, and a respective channel portion extending between the first respective mounting plate and the second respective mounting plate. The respective channel portion can include a respective channel configured to secure a respective post within the respective channel.

Figure 2:
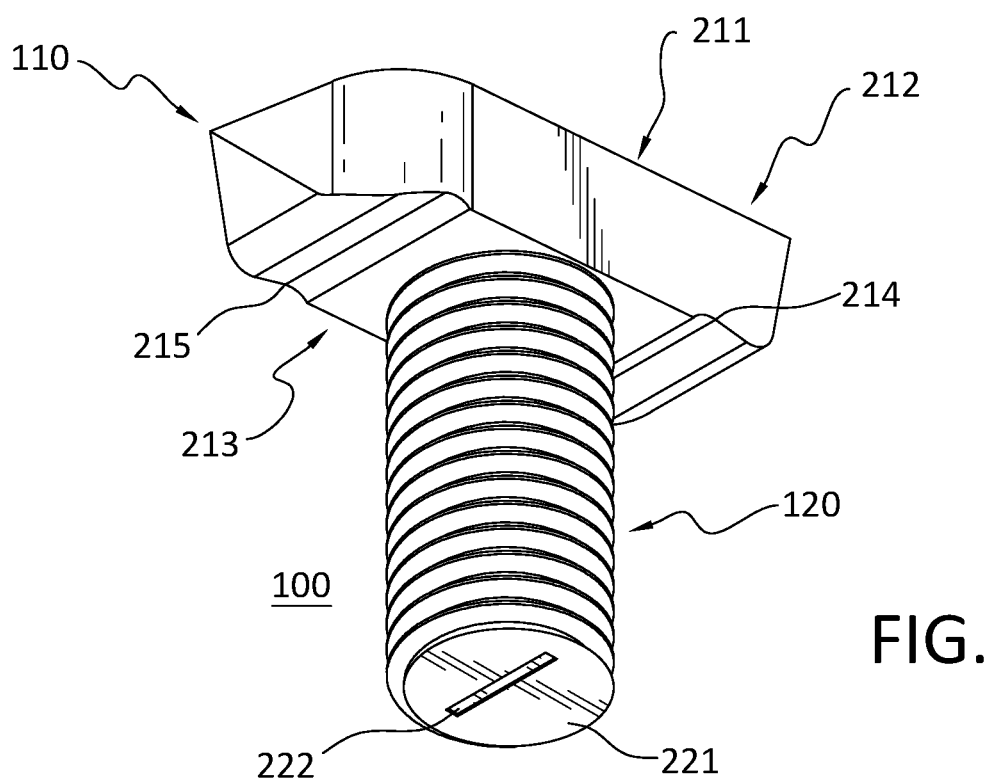
FIG. 2 illustrates a bottom, side perspective view of the T-bolt of FIG. 1.
Figure 3:
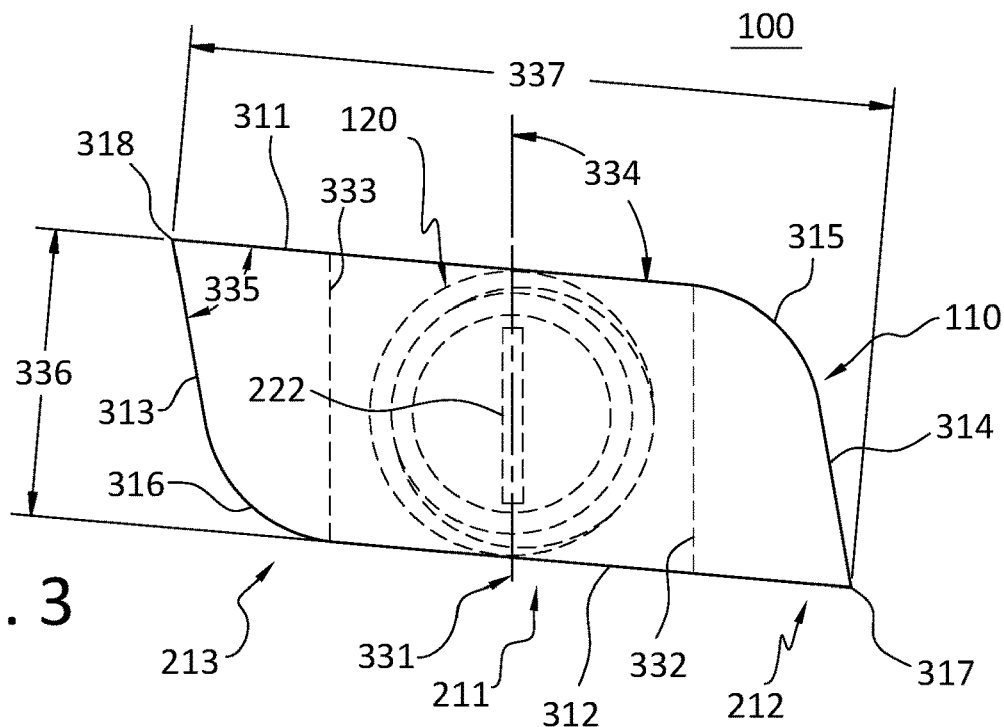
FIG. 3 illustrates a top plan view of the T-bolt of FIG. 1.
Figure 4:
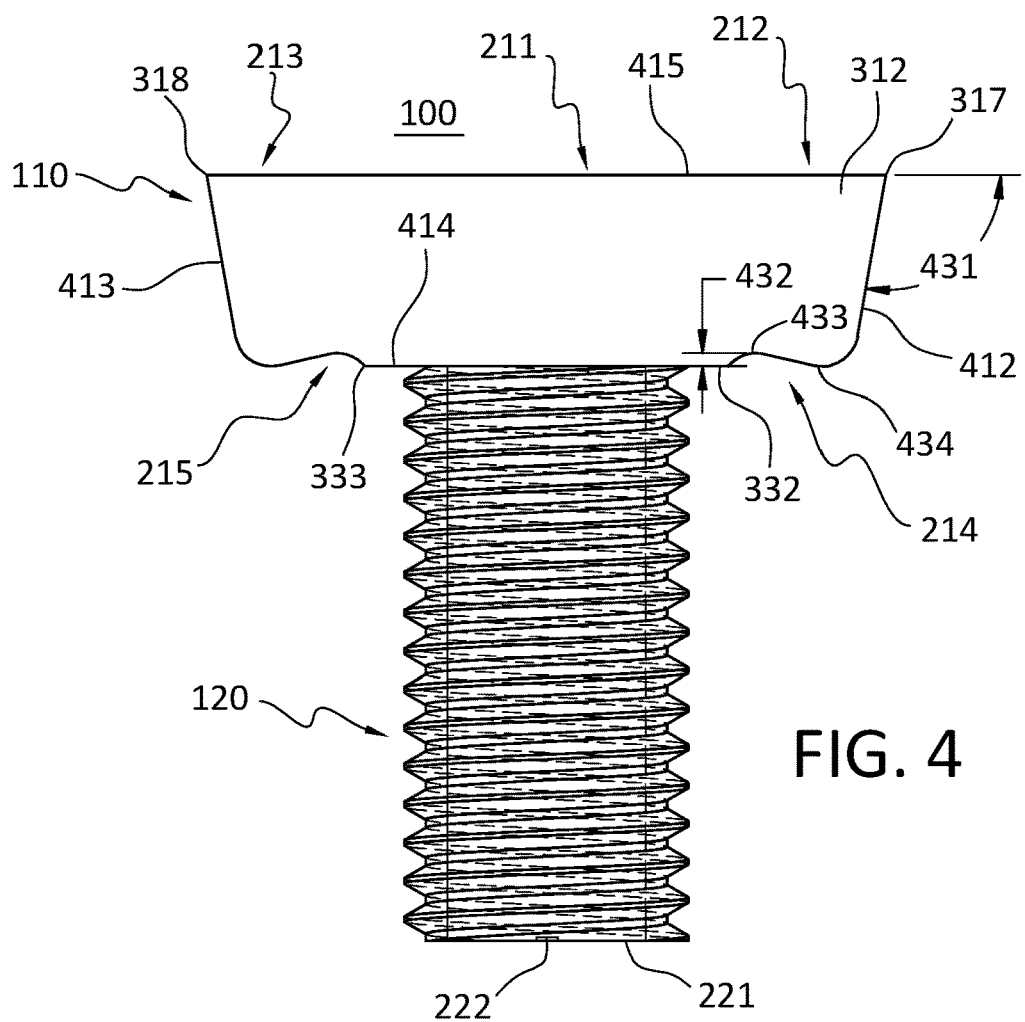
FIG. 4 illustrates a side elevation view of the T-bolt of FIG. 1.

Turning to the drawings, FIG. 1 illustrates a top, side perspective view of a T-bolt 100. FIG. 2 illustrates a bottom, side perspective view of T-bolt 100. FIG. 3 illustrates a top plan view of T-bolt 100. FIG. 4 illustrates a side elevation view of T-bolt 100. T-bolt 100 is merely exemplary, and embodiments of the T-bolt are not limited to embodiments presented herein. The T-bolt can be employed in many different embodiments or examples not specifically depicted or described herein. In many embodiments, such as shown in FIGS. 1-4, T-bolt 100 can include a head 110 and a shank 120. Head 110 can include a center portion 211 between a first end 212 and a second end 213 that is opposite first end 212. First end 212 can include a locking groove 214, and second end 213 can include a locking groove 215. Locking grooves 214 and 215 can extend parallel to each other across the underside of head 110 at each end (212, 213). Shank 120 can extend from center portion 211 of head 110 to a shank end 221. The extended shape of head 110, from first end 212 to second end 213, together with shank 220, can form a T-shape, as shown in FIG. 4. In some embodiments, an entire length of shank 120 can be threaded, as shown in FIGS. 1-2 and 4. In other embodiments, a first portion of shank 120 proximate to head 110 can be non-threaded, and a second portion of shank 120 proximate to shank end 221 can be threaded. In several embodiments, shank end 221 can include an orientation mark 222. As shown in FIG. 2, orientation mark 222 can be a recessed groove in shank end 221. In other embodiments, orientation mark 222 can be a raised protrusion on shank end 221 or another suitable indicator of the orientation of T-bolt 100. T-bolt 100 can be made of steel or another suitable material.

As shown in FIG. 3, head 110 can include a first side 311 and a second side 312 opposite first side 311. In many embodiments, first side 311 can be parallel to second side 312. First side 311 can extend from a corner 318 at second end 213, across center portion 211, to a first rounded surface 315 at first end 212. Second side 312 can extend from a corner 317 at first end 212, across center portion 211, to a second rounded surface 316 at second end 213. Head 110 also can include a third side 313 and a fourth side 314. Third side 313 can be located at second end 213, and can extend from corner 318 to second rounded surface 316. Fourth side 314 can be located at first end 212, and can extend from corner 317 to first rounded surface 315. In many embodiments, third side 313 can be parallel to fourth side 314, or at least edges of third sides 313 and 314 where third sides 313 and 314 meet top of head 110 can be parallel. Head 110 can have a width 336 between first side 311 and second side 312. In many embodiments, width 336 can be approximately the same as the width of shank 120. A length 337 between corner 317 and 318 can be measured orthogonally to width 336. In a number of embodiments, length 337 can be more than twice length 336.

As shown in FIG. 3, orientation mark 222 can extend along a reference line 331, which can be parallel to the lines 332 and 333, which indicate a proximal end of locking grooves 214 and 215 (FIG. 2), respectively. In many embodiments, first side 311 can be positioned at an angle 334 with respect to reference line 331. In many embodiments, angle 334 can be greater than 90 degrees, such that first side 311 is not orthogonal to reference line 331. For example, in some embodiments, angle 334 can be approximately 95 degrees. In other embodiments, angle 334 can be between 90 degrees and 110 degrees, for example. In many embodiments, first side 311 can be positioned at an angle 335 with respect to third side 313 at corner 318. In many embodiments, angle 335 can be less than 90 degrees, such that first side 311 and third side 313 are not orthogonal. For example, in some embodiments, angle 335 can be approximately 75 degrees. In other embodiments, angle 335 can be between 60 degrees and 85 degrees, for example. Second side 312 and fourth side 314 can be similarly disposed, such that head 110 has rotational symmetry when rotated 180 degrees around the axis extending through shank 120.

As shown in FIG. 4, head 110 can extend between a head bottom 414 and a head top 415 at center portion 211. At first end 212, when moving outward from center portion 211, locking groove 214 can extend upwards (toward head top 415) from head bottom 414 at line 332 up to a groove base 433, and then can extend back downward from groove base 433 to a groove end 434, which can be at approximately the same plane as head bottom 414. In many embodiments, locking groove 214 can have a depth 432 between groove base 433 and the plane of head bottom 414. In many embodiments, depth 432 can be at least five percent of the thickness of head 110 between head bottom 411 and head top 415. At second end 213, locking groove 215 can be shaped similarly to locking groove 214 when moving outward from center portion 211.

In several embodiments, a first edge 412 at first end 212 extending between corner 317 at head top 415 and groove end 434 can be at an angle 431 with respect to head top 415. In some embodiments, angle 431 can be greater than 90 degrees, such that first edge 412 is not orthogonal to head top 415. For example, in some embodiments, angle 431 can be 100 degrees. In other embodiments, angle 431 can be between 90 and 120 degrees. A second edge 413 at second end 213 can be disposed similarly to first edge 412, such that head 110 has rotational symmetry when rotated 180 degrees around the axis extending through shank 120.

Turning ahead in the drawings, FIG. 5 illustrates a top, front, right side perspective view of an edge angle 510 with T-bolt 100 attached in an anchor channel 511 of edge angle 510. FIG. 6 illustrates a right side view of edge angle 510 with T-bolt 100 attached in anchor channel 511 of edge angle 510. The use of T-bolt 100 with edge angle 510 is merely exemplary, and T-bolt 100 can be used in many different configurations and examples not specifically depicted or described herein. Edge angle 510 can be similar to pour stop 103 shown and described in U.S. Pat. No. 9,708,812, issued Jul. 18, 2017 (the "'812 patent"), which is incorporated herein by reference in its entirety, and various elements thereof can be similar or identical to various elements of edge angle 510. Edge angle 510 also can be similar to curtain wall anchor 501 (also referred to as edge angle hangar 501) shown and described in U.S. Pat. No. 9,416,529, issued Aug. 16, 2016 (the "'529 patent"), which is incorporated herein by reference in its entirety, and various elements thereof can be similar or identical to various elements of edge angle 510.

As shown in FIGS. 5-6, edge angle 510 can include an anchor channel 511, which can be positioned between an upper face 512 and a lower face 513. Anchor channel 511 can be a void space bounded by a rear wall 518, a top wall 516 and a bottom wall 517 extending frontward from rear wall 518, and an upper channel flange 514 and a lower channel flange 515 at the front of anchor channel 511. Edge angle 510 also can include a flange 519 for engagement (e.g., welded connection) with a structural element, such as an I-beam of a building. As shown in FIG. 6, on the inside of anchor channel 511, upper channel flange 514 can flare rearward as upper channel flange 514 extends downward from top wall 516 to the opening of anchor channel 511. Similarly, on the inside of anchor channel 511, lower channel flange 515 can flare rearward as lower channel flange 515 extends upward from bottom wall 517 to the opening of anchor channel 511.

In many embodiments, T-bolt 100 can be inserted into anchor channel 511 by rotating T-bolt 100 such that head 110 is oriented sideways along the length of anchor channel 511, which can allow head 110 to fit within the opening of anchor channel 511, provided that width 336 (FIG. 3) is smaller than the opening of anchor channel 511. After head 110 of T-bolt 100 is inserted into anchor channel 511, T-bolt 100 can be rotated clockwise within anchor channel 511 until orientation mark 222 is horizontal (or extending in the same direction as anchor channel 511). In this orientation, T-bolt 100 is locked within anchor channel 511, as the ends (212-213 (FIG. 2)) of head 110 are held in anchor channel 511 by the channel flanges (514-515). Although T-bolt 100 is locked within anchor channel 511 in this orientation, T-bolt 100 is slidable longitudinally along anchor channel 511 until secured. T-bolt 100 can be secured at position along edge angle 510 by fastening a nut 502 on T-bolt 100. For example, a washer 501 and nut 502 can be used to fasten T-bolt at a position along edge angle 510, as shown in FIGS. 5-6. In many embodiments, T-bolt 100 can be used to secure a bracket, sleeve (such as post sleeve 700, as shown in FIGS. 7-8 and described below), or another suitable attachment to edge angle 510.

As shown in FIG. 6, when T-bolt 100 is rotated such that head 110 is oriented approximately upright, the inner flare of upper channel flange 514 can engage with locking groove 214, and the inner flare of lower channel flange 515 can engage with locking groove 215, which can prevent T-bolt 100 from rotating. Additionally, in many embodiments, the shape of head 110 of T-bolt 100 can provide a rotational lock. For example, the rounded surfaces 315-16 (FIG. 3) and the corners 317-318 (FIG. 3) of head 110 can allow T-bolt 100 to be rotated clockwise after insertion into anchor channel 511 until orientation mark 222 is horizontal, at which point further clockwise rotation can be prevented by corners 317-318 (FIG. 3) abutting top wall 516 and bottom wall 517 of anchor channel 511. This rotational locking can occur when the distance between corners 317 and 318 (FIG. 3) is greater than the distance between top wall 516 and bottom wall 517. When nut 502 is tightened on T-bolt 100, the clockwise rotation of nut 502 during tightening keeps corners 317-318 (FIG. 3) abutting top wall 516 and bottom wall 517 of anchor channel 511, preventing further clockwise rotation of T-bolt 100, such that head 110 remains oriented approximately upright and T-bolt 100 is locked within anchor channel 511. Additionally, the orientation of head 110 within anchor channel 511 can be verified using orientation mark 522.

Figure 7:
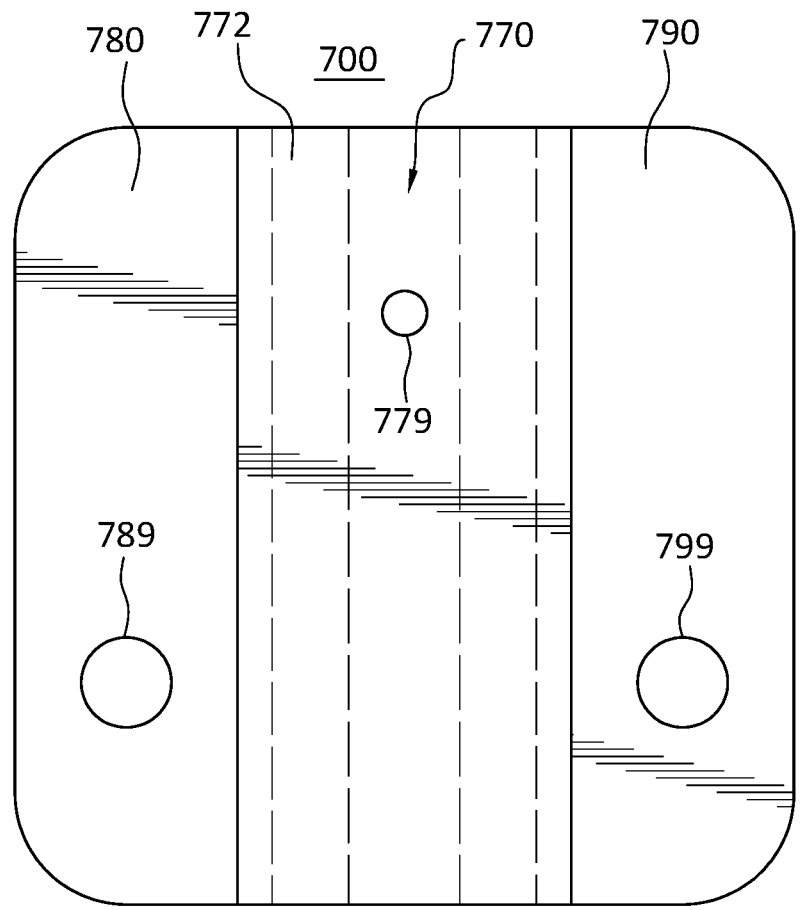
FIG. 7 illustrates a front elevation view of a post sleeve, according to another embodiment.
Figure 8:
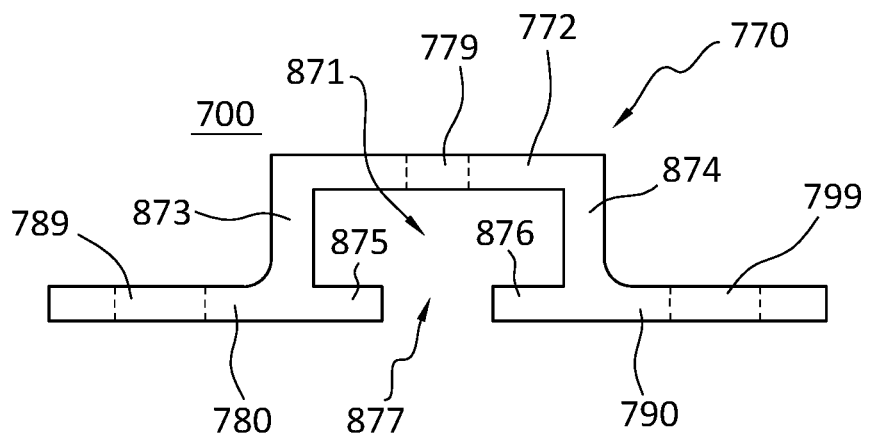
FIG. 8 illustrates a bottom plan view of the post sleeve of FIG. 7.

Turning ahead in the drawings, FIG. 7 illustrates a front elevation view of a post sleeve 700. FIG. 8 illustrates a bottom plan view of post sleeve 700. Post sleeve 700 is merely exemplary, and embodiments of the post sleeve are not limited to embodiments presented herein. The post sleeve can be employed in many different embodiments or examples not specifically depicted or described herein. In many embodiments, such as shown in FIGS. 7-8, post sleeve 700 can include a channel portion 770 between a first mounting plate 780 and a second mounting plate 790. Post sleeve 700 can be made of steel or another suitable material.

Channel portion 770 can include a channel 871, which can be a void space bounded at the front by front wall 772, bounded at the rear by a first channel flange 875 and a second channel flange 876, and bounded at the sides by a first side wall 873 extending rearward from front wall 772 to first channel flange 875 and a second side wall 874 extending rearward from front wall 772 to second channel flange 876. In many embodiments, channel 871 can extend from a top of post sleeve 700 to a bottom of post sleeve 700, such that channel 871 is open at the top and the bottom of post sleeve 700.

In many embodiments, first mounting plate 780 can be planar with second mounting plate 790, as shown in FIG. 8. In a number of embodiments, first channel flange 875 can be planar with second channel flange 876, as shown in FIG. 8. In several embodiments, first mounting plate 780 can be planar with first channel flange 875, and second mounting plant 790 can be planar with second channel flange 876, as shown in FIG. 8. In other embodiments, the channel flanges (875-876) can be positioned frontward of the mounting plates (780, 790). In many embodiments, first channel flange 875 and second channel flange 876 can be separated by an opening 877, as shown in FIG. 8. In other embodiments, first channel flange 875 and second channel flange 876 can be connected without an opening.

In several embodiments, channel 871 can have a rectangular cross-section, such that the side-to-side width of channel 871 (e.g., the width first side wall 873 to second side wall 874) is greater than the front-to-back width of channel 871 (e.g., the distance between front wall 772 and the plane of first channel flange 875 and second channel flange 876), as shown in FIG. 8. In other embodiments, channel 871 can have a rectangular cross-section with a greater front-to-back width than side-to-side width. In still other embodiments, channel 871 can have a square cross-section, an oval cross-section, a circular cross section, or another suitably shaped cross-section.

In several embodiments, first mounting plate 780 can include a hole 789, and second mounting plate 790 can include a hole 799. In many embodiments, holes 789 and 799 can be positioned at the same height as each other at a lower portion of post sleeve 700. Holes 789 and 799 can be used for mounting post sleeve 700 to an anchor channel, such as anchor channel 511 (FIGS. 5-6) of edge angle 510 (FIGS. 5-6) with bolts, such as T-bolt 100 (FIGS. 1-6). For example, post sleeve 700 can be secured to edge angle 510 (FIGS. 5-6) with the rear surfaces of mounting plates 780 and 790 abutting upper face 512 (FIGS. 5-6) and/or lower face 513 (FIGS. 5-6) of edge angle 510, and channel portion 770 extending outward (frontward) away from edge angle 510 (FIGS. 5-6).

In a number of embodiments, post sleeve 700 can be configured to confine a post within channel 871, such that the post is slidable vertically within channel 871 until secured. In a number of embodiments, front wall 772 can include a hole 779. Hole 779 can be positioned at an upper portion of post sleeve 700. Hole 779 can be used with a pin, screw, bolt, or other fastener, to secure the vertical position of the post within channel 871.

Turning ahead in drawings, FIG. 9 illustrates a front, top, left side perspective view of a system 900. FIG. 10 illustrates a front, top, right side perspective view of system 900. FIG. 11 illustrates a front elevational view of system 900. System 900 is merely exemplary, and embodiments of the system are not limited to embodiments presented herein. The system can be employed in many different embodiments or examples not specifically depicted or described herein. In many embodiments, such as shown in FIGS. 9-11, system 900 can include a railing system 940, an edge angle 931, and/or a structural element 930. Edge angle 931 can be similar to edge angle 510 (FIGS. 5-6), and various elements of edge angle 931 can be similar or identical to various elements of edge angle 510 (FIGS. 5-6). Edge angle 931 can be secured to structural element 930, such as by welding or another suitable approach. Structural element 930 can be a structural element of a building, such as a structural steel I-beam of a building.

In many embodiments, railing system 940 can include posts, such as posts 951 and 952, post sleeves, such as post sleeves 941 and 942, and railing cables, such as railing cables 961 and 962. Post sleeves 941 and 942 can each be similar or identical to post sleeve 700 (FIGS. 7-8), and various elements of post sleeves 941 and 942 can be similar or identical to various elements of post sleeve 700 (FIGS. 7-8). Posts 951 and 952 can be secured to edge angle 931 using post sleeves 941 and 942, respectively. In a number of embodiments, each post (e.g., 951, 952) can include railing attachments that can be connected to the railing cables (e.g., 961, 962). For example, post 952 can include railing attachments 1061 and 1062, which can be connected to railing cables 961 and 962, respectively. The railing attachment (e.g., 1061, 1062) can each be a loop or another suitable connector. In several embodiments, each post sleeve (e.g., 941, 942) can secure the posts (e.g., 951-952) to edge angle 931 using bolts and nuts. For example, post sleeve 942 can be secured to edge angle 931 using bolts 943 and 944 and nuts 945 and 946. In several embodiments, bolts 943-944 can be T-bolts, which can be similar or identical to T-bolt 100, and which can lock in an anchor channel of edge angle 931. Bolts 943 and 944 can extend through holes in post sleeve 942, which can be similar or identical to holes 789 and 799 (FIGS. 7-8). Post 952 can be secured in post sleeve 942 using a bolt 947 and a nut 948. In other embodiments, a pin, screw, or other fastener can be used to secure post 952 in post sleeve 942. Post 951 can be similarly secured in post sleeve 941.

Proceeding to the next drawing, FIG. 12 illustrates a right side view along cross-sectional line 12-12 shown in FIG. 11, showing post 952 secured in post sleeve 942 to edge angle 931. In many embodiments, the posts can include a bend. For example, post 952 can include a bend 1253 between a lower portion 1251 and an upper portion 1252 of post 952. When installed as part of railing system 940, the posts, such as post 952, can be positioned in the post sleeves, such as post sleeve 942, such that the posts are angled inward toward structural element 930. For example, as shown in FIG. 12, lower portion 1251 can be substantially vertical when secured using post sleeve 942, and upper portion 1252 can be angled inward at an angle of approximately 2 to 10 degrees. In other embodiments, the posts do not include a bend.

Figure 13:
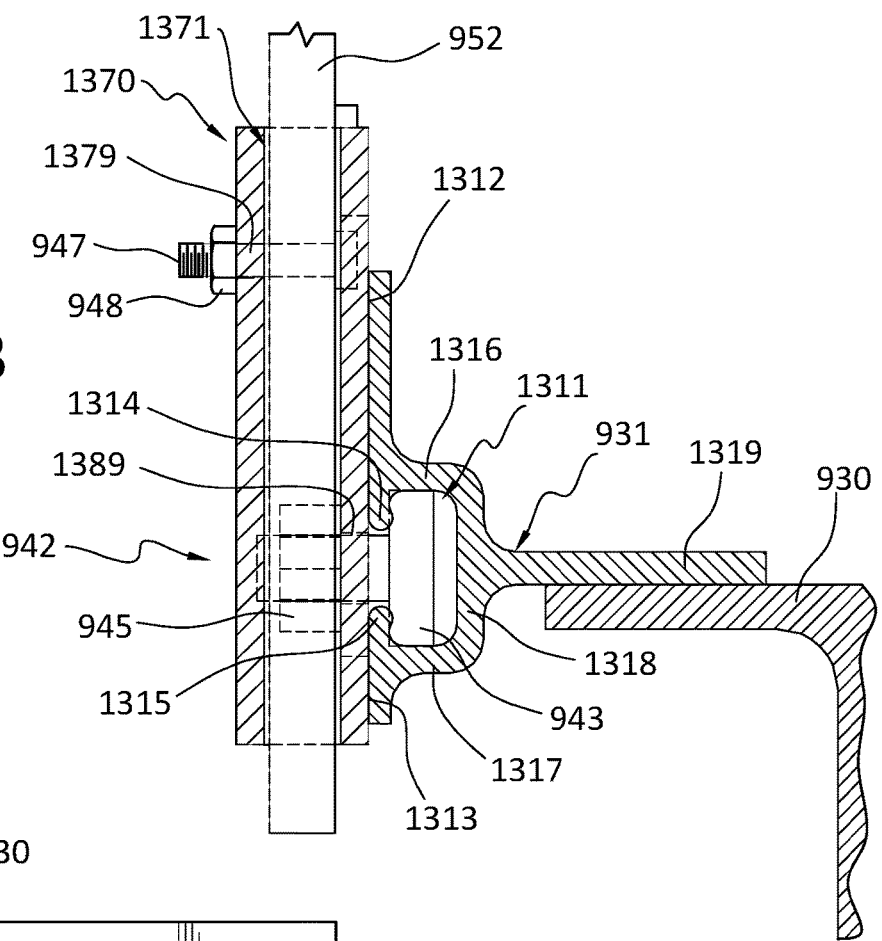
FIG. 13 illustrates an enlarged view of a portion of FIG. 12, as indicated in FIG. 12.
Figure 14:
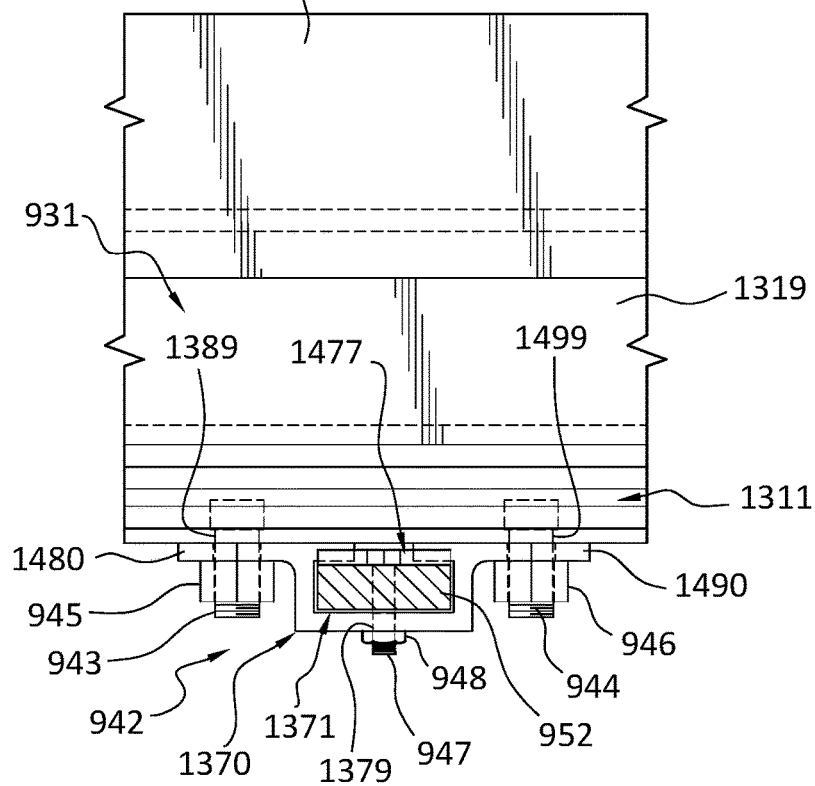
FIG. 14 illustrates a top view of along cross-sectional line 13-13 shown in FIG. 11, showing the post of FIG. 9 secured in the post sleeve of FIG. 9 to the edge angle of FIG. 9.

Turning ahead in the drawings, FIG. 13 illustrates an enlarged view of a portion of FIG. 12, as indicated in FIG. 12. FIG. 14 illustrates a top view of along cross-sectional line 13-13 shown in FIG. 11, showing post 952 secured in post sleeve 942 to edge angle 931. Edge angle 931 can include an anchor channel 1311, which can be positioned between and behind an upper face 1312 and a lower face 1313. Anchor channel 1311 can be a void space bounded at the rear by a rear wall 1318, on the top and bottom by a top wall 1316 and a bottom wall 1317, respectively, extending frontward from rear wall 1318, and at the front by an upper channel flange 1314 and a lower channel flange 1315 at the front of anchor channel 1311. Edge angle 941 also can include a flange 1319 extending rearward for engagement (e.g., via welded connection) with structural element 930, such as an I-beam of a building. Bolt 943 can be used with nut 945 to secure post sleeve 942 to edge angle 931. For example, a head of bolt 943, which can be similar or identical to head 110 (FIG. 1) of T-bolt 100 (FIG. 1), can be positioned in a locked position in anchor channel 1311, and a shank of bolt 943, which can be similar or identical to shank 120 (FIG. 1) of T-bolt 100 (FIG. 1), can extend through a hole 1389 of a first mounting plate 1480 of post sleeve 942, which can be similar or identical to hole 789 (FIGS. 7-8) of first mounting plate 780 (FIGS. 7-8) of post sleeve 700 (FIGS. 7-8), and be fastened with nut 945. Bolt 944 similarly can extend through a hole 1499 of a second mounting plate 1490 of post sleeve 942, which can be similar or identical to hole 799 (FIGS. 7-8) of second mounting plate 799 (FIGS. 7-8) of post sleeve 700 (FIGS. 7-8), and be fastened with nut 946.

Post 952 can be positioned within a channel 1371 of a channel portion 1370 of post sleeve 942, which can be similar or identical to channel 871 (FIG. 8) of channel portion 770 (FIGS. 7-8) of post sleeve 700 (FIGS. 7-8). Bolt 947 can be used with nut 948 to secure a vertical position of post 952 within channel 1371. In many embodiments, a head of bolt 947 can be positioned within an opening 1477 of post sleeve 942, which can be similar or identical to opening 877 (FIG. 8) of post sleeve 700 (FIGS. 7-8). A shank of bolt 947 can extend through post 952, such as a hole in post 952, and through a hole 1379 in channel portion 1370 of post sleeve 942, which can be similar or identical to hole 779 (FIGS. 7-8) in channel portion 770 (FIGS. 7-8) of post sleeve 700 (FIGS. 7-8). Bolt 947 can be fastened with nut 948

In many embodiments, railing system 940 (FIGS. 9-12) can be temporarily installed during construction of a building in order to provide a temporary safety railing until a curtain wall is installed. For example, once edge angle 931 is attached to structural element 930, railing system 940 can be installed, such as shown in FIGS. 9-14. Additional construction can occur on the building, such as pouring a concrete slab (which can occur either before or after installing railing system 940), and installing a curtain wall. For example, as described in the '812 patent and the '529 patent, a curtain wall can be attached to anchor channel 1311. In several embodiments, the curtain wall can beneficially be installed while railing system 940 remains installed. In many embodiments, both the curtain wall and railing system 940 (FIGS. 9-12) can be secured to the structural support of the building using anchor channel 1311. In a number of embodiments, railing system 940 (FIGS. 9-12) can provide an Occupational Safety and Health Administration (OSHA)-compliant safety railing system while the building is being constructed. After the curtain wall is installed, railing system 940 can advantageously be removed while the curtain wall remains installed, without affecting the installation of the curtain wall. For example, the bolts in anchor channel 1311 that are used to secure the post sleeves (e.g., 941, 942 (FIGS. 9-12)), such as bolts 943 and 944, can be removed, and railing system 940 (FIGS. 9-12) can be removed. In other embodiments, the post sleeves (e.g., 941, 942 (FIGS. 9-12)) can remain attached to anchor channel 1311, and the posts (e.g., 951, 952 (FIGS. 9-12)) can be removed, along with the railing cables (e.g., 961, 962), such as by removing bolt 947. The installation and/or removal of railing system 940 can be facilitated using the components and/or techniques described herein, as railing system 940 can beneficially be installed without welding portions of railing system 940 to a structural element (e.g., 930) and/or an edge angle (e.g., 931), and/or can be removed without removing any such welds.

Turning ahead in the drawings, FIG. 15 illustrates a front, bottom, right side perspective view of a post sleeve 1500 with a shear tab 1510 connected to a slot assembly 1581 of post sleeve 1500. FIG. 16 illustrates a bottom plan view of post sleeve 1500 with shear tab 1510 and a shear tab 1610 connected to post sleeve 1500. FIG. 17 illustrates a front elevation view of post sleeve 1500 with shear tab 1510 and shear tab 1610 connected to post sleeve 1500. Post sleeve 1500 and shear tabs 1510 and 1610 are merely exemplary, and embodiments of the post sleeve and shear tabs are not limited to embodiments presented herein. The post sleeve and/or shear tabs can be employed in many different embodiments or examples not specifically depicted or described herein. Post sleeve 1500 can be similar to post sleeve 700 (FIGS. 7-8), and various elements of post sleeve 1500 can be similar or identical to various elements of post sleeve 700 (FIGS. 7-8). In many embodiments, such as shown in FIGS. 15-17, post sleeve 1500 can include a channel portion 1570 between a first mounting plate 1580 and a second mounting plate 1590. Post sleeve 1500 can include one or more slot assemblies, such as slot assemblies 1581 and 1591. For example, in some embodiments, such as shown in FIGS. 15-18, post sleeve 1500 can include a slot assembly (e.g., 1581, 1591) on each side of channel portion 1570. Post sleeve 1500 can be made of steel or another suitable material.

Channel portion 1570 can be similar or identical to channel portion 770 (FIGS. 7-8), and various elements of channel portion 1570 can be similar or identical to various elements of channel portion 770 (FIGS. 7-8). For example, channel portion 1570 can include a channel 1671, which can be similar to channel 871 (FIGS. 7-8), and which can be a void space bounded at the front by front wall 1672, bounded at the rear by a first channel flange 1675 and a second channel flange 1676, and bounded at the sides by a first side wall 1673 extending rearward from front wall 1672 to first channel flange 1675 and a second side wall 1674 extending rearward from front wall 1672 to second channel flange 1676. In many embodiments, channel 1671 can extend from a top of post sleeve 1500 to a bottom of post sleeve 1500, such that channel 1671 is open at the top and the bottom of post sleeve 1500.

In many embodiments, first mounting plate 1580 can be planar with second mounting plate 1590, as shown in FIG. 16. In a number of embodiments, first channel flange 1675 can be planar with second channel flange 1676. In several embodiments, first mounting plate 1580 can be planar with first channel flange 1675, and second mounting plant 1590 can be planar with second channel flange 1676, as shown in FIG. 16. In other embodiments, the channel flanges (1675-1676) can be positioned frontward of the mounting plates (1580, 1590). In many embodiments, first channel flange 1675 and second channel flange 1676 can be separated by an opening 1677, as shown in FIG. 16. In other embodiments, first channel flange 1675 and second channel flange 1676 can be connected without an opening.

In several embodiments, channel 1671 can have a rectangular cross-section, such that the side-to-side width of channel 1671 (e.g., the width first side wall 1673 to second side wall 1674) is greater than the front-to-back width of channel 1671 (e.g., the distance between front wall 1672 and the plane of first channel flange 1675 and second channel flange 1676), as shown in FIG. 16. In other embodiments, channel 1671 can have a rectangular cross-section with a greater front-to-back width than side-to-side width. In still other embodiments, channel 1671 can have a square cross-section, an oval cross-section, a circular cross section, or another suitably shaped cross-section.

In several embodiments, first mounting plate 1580 can include a hole 1689, and second mounting plate 1590 can include a hole 1699. In many embodiments, holes 1689 and 1699 can be positioned at the same height as each other at a lower portion of post sleeve 1500. Holes 1689 and 1699 can be used for mounting post sleeve 1500 to an anchor channel, such as anchor channel 511 (FIGS. 5-6) of edge angle 510 (FIGS. 5-6) or anchor channel 1311 (FIGS. 13-14) of edge angle 931 (FIGS. 9-14), with bolts, such as T-bolt 100 (FIGS. 1-6). For example, a bolt 1544 can be inserted in hole 1699 and fastened with a nut 1546.

Post sleeve 1500 can be configured to confine a post within channel 1571, such that the post is slidable vertically within channel 1671 until secured. In a number of embodiments, front wall 1672 can include a hole 1679. Hole 1679 can be positioned at an upper portion of post sleeve 1500. Hole 1679 can be used with a pin, screw, bolt, or other fastener, to secure the vertical position of the post within channel 1671. For example, a pin 1547 can be used in hole 1679.

In many embodiments, slot assembly 1591 can include a first slot flange 1592 and a second slot flange 1593, which collectively can define a slot 1594. Slot assembly 1581 similar can include a first slot flange 1682 and a second slot flange 1683, which collectively can define a slot. The slots (e.g., 1594) can be configured to lock shear tabs, such as shear tabs 1510 and 1610 within the slots. In many embodiments, slot assembly 1581 can be located between hole 1689 and channel portion 1570, and slot assembly 1591 can be located between hole 1699 and channel portion 1570.

In several embodiments, shear tab 1510 can include a mount portion 1512 and an extension portion 1511. Mount portion 1512 can include a first tab 1513 and a second tab 1514. In some embodiments, the tabs (e.g., 1513, 1514) can be flared at the end of the mount portion (e.g., 1512) of the shear tab (e.g., 1510). Similarly, shear tab 1610 can include a mount portion 1612 and an extension portion 1611. Mount portion 1612 can include a first tab 1613 and a second tab 1614. The shear tab (e.g., 1510, 1610) can be connected to the post sleeve (e.g., 1500) using the mount portion (e.g., 1512, 1612). For example, mount portion 1612 of shear tab 1610 can be slid within slot 1594, such that first slot flange 1592 engages with first tab 1613 and second slot flange 1593 engages with second tab 1614 to connect shear tab 1610 to slot assembly 1591. Shear tab 1510 can be similarly connected to slot assembly 1581.

In several embodiments, extension portion 1511 of shear tab 1510 can extend outward (e.g., frontward) from where post sleeve 1510 is connected in slot assembly 1581. Extension portion 1511 can include a hole 1519, which can be used with a fastener, such as a bolt, to connect to a mullion, such as a vertical mullion of a curtain wall, of another curtain wall element. Extension portion 1611 of shear tab 1610 similarly can include a hole 1619. In many embodiments, shear tabs 1510 and 1610 can be positioned on opposing sides of the mullion, and a bolt can be used through holes 1519, 1619, and the mullion to connect the mullion to shear tabs 1510 and 1610. The shear assemblies (e.g., 1581, 1591) and shear tabs (e.g., 1510, 1610) can provide structural connections to the curtain wall mullion.

In many embodiments, the shear tab (e.g., 1510, 1610) can be slidable vertically within the slot assembly (e.g., 1581, 1591), which can advantageously allow for vertical expansion and contraction of the mullion and/or curtain wall, while preventing the mullion and/or curtain wall from separating from post sleeve 1500. In some embodiments, the slot assemblies can include a bottom, such as a bottom portion at the bottom of slot 1594, which can prevent the bottom of shear tab from sliding out the bottom of slot 1594. In other embodiments, shear tabs 1510 and 1610 can be integral with post sleeve 1500.

Figure 18:
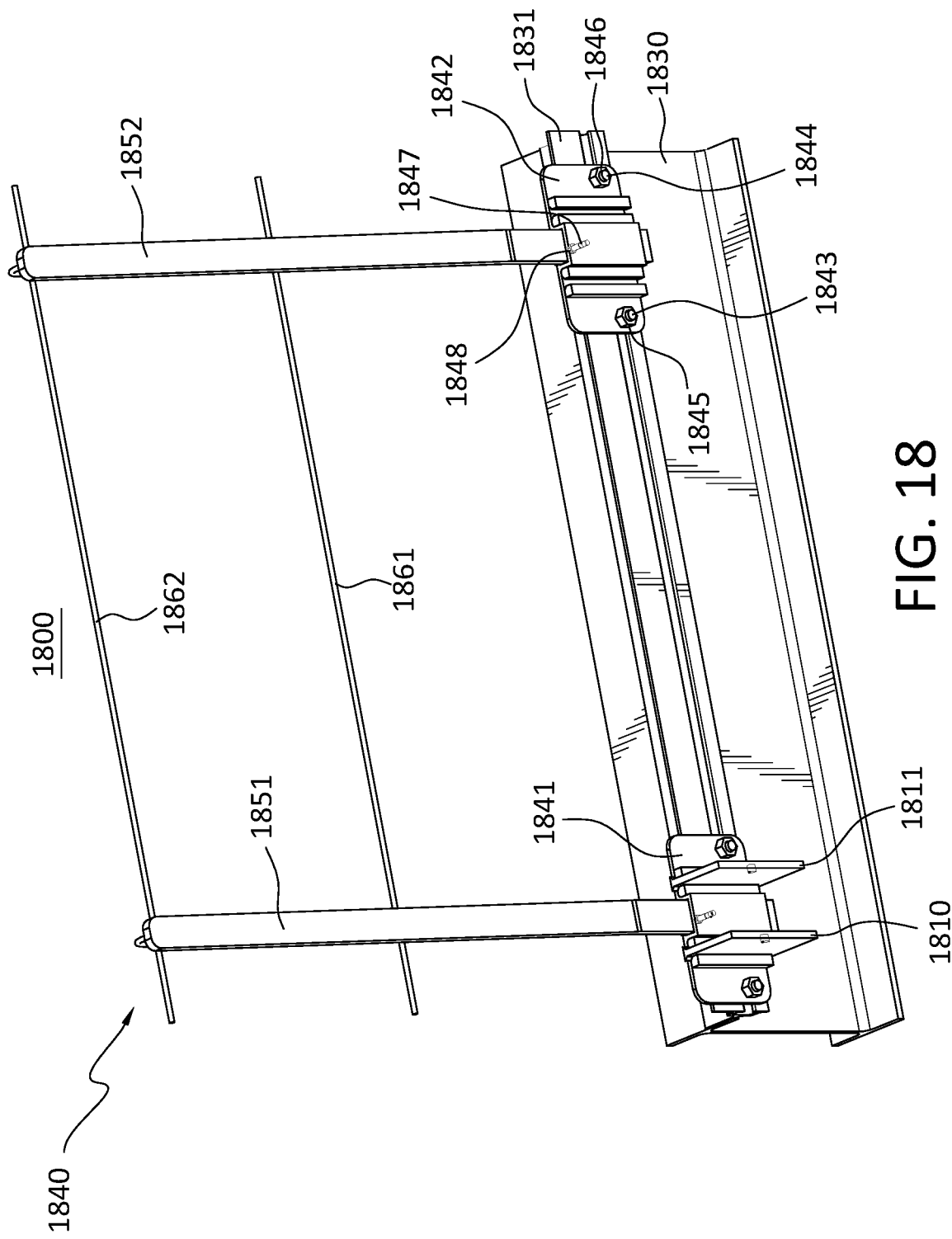
FIG. 18 illustrates a front, top, left side perspective view of a system, according to another embodiment.

Turning ahead in drawings, FIG. 18 illustrates a front, top, left side perspective view of a system 1800. System 1800 is merely exemplary, and embodiments of the system are not limited to embodiments presented herein. The system can be employed in many different embodiments or examples not specifically depicted or described herein. In many embodiments, such as shown in FIG. 18, system 1800 can include a railing and shear tab system 1840, an edge angle 1831, and/or a structural element 1830. Edge angle 1831 can be similar to edge angle 510 (FIGS. 5-6) and/or edge angle 931 (FIGS. 9-14), and various elements of edge angle 1831 can be similar or identical to various elements of edge angle 510 (FIGS. 5-6) and/or edge angle 931 (FIGS. 9-14). Edge angle 1831 can be secured to structural element 1830, such as by welding or another suitable approach. Structural element 1830 can be similar or identical to structural element 930 (FIGS. 9-14), and can be a structural element of a building, such as a structural steel I-beam of a building.

In many embodiments, railing and shear tab system 1840 can include posts, such as posts 1851 and 1852, post sleeves, such as post sleeves 1841 and 1842, and railing cables, such as railing cables 1861 and 1862. Post sleeves 1841 and 1842 can each be similar or identical to post sleeve 1500 (FIGS. 15-17), and various elements of post sleeves 941 and 942 can be similar or identical to various elements of post sleeve 1500 (FIGS. 15-17). Posts 1851-1852 can be similar or identical to posts 941-942 (FIGS. 9-11). Railing cables 1861-1862 can be similar or identical to railing cables 961-962 (FIGS. 9-12). Posts 1851 and 1852 can be secured to edge angle 1831 using post sleeves 1841 and 1842, respectively. In a number of embodiments, each post (e.g., 1851, 1852) can include railing attachments (not shown), which can be similar or identical to railing attachments 1061-1062 (FIG. 10), and which can be connected to the railing cables (e.g., 1861, 1862). In several embodiments, each post sleeve (e.g., 1841, 1842) can secure the posts (e.g., 1851-1852) to edge angle 1831 using bolts and nuts. For example, post sleeve 1842 can be secured to edge angle 1831 using bolts 1843 and 1844 and nuts 1845 and 1846. In several embodiments, bolts 1843-1844 can be T-bolts, which can be similar or identical to T-bolt 100, and which can lock in an anchor channel of edge angle 1831. Bolts 1843 and 1844 can extend through holes in post sleeve 1842, which can be similar or identical to holes 1689 and 1699 (FIGS. 16-17).

Post 1852 can be positioned within a channel of a channel portion of post sleeve 1842, which can be similar or identical to channel 1671 (FIG. 16) of channel portion 1570 (FIGS. 15-17) of post sleeve 1500 (FIGS. 15-17). Post 1852 can be secured in post sleeve 1842 using a bolt 1847 and a nut 1848. In other embodiments, a pin, screw, or other fastener can be used to secure post 1852 in post sleeve 1842. Post 1851 can be similar secured within post sleeve 1842.

As shown in FIG. 18, railing and shear tab system 1840 can include shear tabs 1810 and 1811, which can be connected to post sleeve 1841. Shear tabs 1810-1811 can be similar or identical to shear tab 1510 (FIGS. 15-17) and/or shear tab 1610 (FIGS. 16-17). When post sleeve 1841 is secured to edge angle 1831, the shear tabs (e.g., 1810-1811) can be used to connect a mullion of a curtain wall to edge angle 1831. Railing and shear tab system 1840 can include other shear tabs, which can be connected to post sleeve 1842, for example, to attach other mullions of the curtain wall to edge angle 1831.

In many embodiments, railing and shear tab system 1840 can be installed during construction of the building in order to provide a temporary safety railing until a curtain wall is installed and provide attachment points for a curtain wall to be structurally secured to the building. For example, once edge angle 1831 is attached to structural element 1830, post sleeves (e.g., 1841, 1842) can be secured to edge angle 1831, and posts (e.g., 1851, 1852) can be installed in the post sleeves (e.g., 1841, 1842), and railing cables (e.g., 1861-1862) can be installed, such as shown in FIG. 18. Additional construction can occur on the building, such as pouring a concrete slab (which can occur either before or after installing the posts and railing cables). Additionally, shear tabs (e.g., 1810, 1811) can be used to install a curtain wall by attaching the shear tabs (e.g., 1810, 1811) to the mullions of the curtain wall. In several embodiments, the curtain wall can beneficially be installed while posts and railing cables remain installed. Both the curtain wall and the railing can be secured to the structural support of the building (e.g., 1830) using edge angle 1831. In a number of embodiments, the railing can provide an OSHA-compliant safety railing system while the building is being constructed. After the curtain wall is installed, the posts (e.g., 1851, 1852) can be removed from the post sleeves (e.g., 1841, 1842), and the railing cables (e.g., 1861-1862) also can be removed, while the curtain wall remained installed, without affecting the installation of the curtain wall. In many embodiments, the post sleeves (e.g., 1841, 1842) can remain installed as a permanent component of the building to secure the curtain wall to the building even after the posts (e.g., 1851, 1852) are removed from the post sleeves (e.g., 1841, 1842). In several embodiments, the post sleeves (e.g., 1841, 1842) can beneficially be longitudinally adjustable along the anchor channel in edge angle 1831 while installing the curtain wall, to adjust to suitable positions of the mullions of the curtain wall.

Although locking t-bolts, post sleeves, post sleeves with shear connections, and related systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that various element of FIGS. 1-18 may be interchanged or otherwise modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A post sleeve comprising:
   a first mounting plate comprising a first mounting hole;
   a second mounting plate comprising a second mounting hole; and
   a channel portion extending between the first mounting plate and the second mounting plate,
   wherein:
     the channel portion comprises a channel configured to secure a post within the channel comprising a void space bounded by a front wall, at least one rear wall, a first side wall extending rearward from the front wall toward the at least one rear wall and a second side wall extending rearward from the front wall toward the at least one rear wall, the at least one rear wall, and the first and second mounting plates being planar with each other; and
     the first and second mounting plates are configured to be attached to an anchor channel of an edge angle using a fastener.

2. The post sleeve of claim 1, wherein:
   the channel portion comprises an opening in the at least one rear wall separating the first mounting plate and the second mounting plate.

3. The post sleeve of claim 1 further comprising:
   a first slot configured to slidably secure a first shear tab; and a second slot configured to slidably secure a second shear tab,
   wherein the first and second slots are positioned on the post sleeve on opposite sides of the channel portion.

4. The post sleeve of claim 3, wherein:
   the first slot is positioned between the first mounting hole and the channel portion; and
   the second slot is positioned between the second mounting hole and the channel portion.

5. The post sleeve of claim 3, wherein:
   the post sleeve is configured to secure a mullion of a curtain wall to the edge angle using the first and second shear tabs.

6. The post sleeve of claim 1 wherein the first and second mounting plates are configured to be attached to an anchor channel of an edge angle using a first locking T-bolt through the first mounting hole and a second locking T-bolt through the second mounting hole, each locking T-bolt including a head having a first side mating with a first end via a first rounded surface and a second side mating with a second end via a second rounded surface.

7. A system comprising:
   the post sleeve of claim 6;
   wherein each locking T-bolt comprises:
     a respective head comprising first and second ends each comprising respective locking grooves configured to lock the respective head of the T-bolt within the anchor channel; and
     a respective shank, wherein at least a portion of the respective shank is threaded.

8. The system of claim 7, wherein:
   the respective head of the each respective locking T-bolt is shaped to rotationally lock in a substantially upright position within the anchor channel when a nut is being attached to the respective shank of the each respective locking T-bolt of the two locking T-bolts.

9. The system of claim 7, wherein:
   the respective shank of the each respective locking T-bolt comprises an orientation mark.

10. A railing system comprising:
    two or more of the post sleeve of claim 1;
    two or more posts each comprising respective railing attachments and each configured to be secured by a different one of the two or more of the post sleeve of claim 1; and
    railing cables,
    wherein the respective railing attachments of each of the two or more posts are configured to be connected to the railing cables.

11. The railing system of claim 10 further comprising:
    two locking T-bolts for each of the two or more of the post sleeve.

12. A method comprising:
    providing a post sleeve, wherein the post sleeve comprises:
      a first mounting plate comprising a first mounting hole;
      a second mounting plate comprising a second mounting hole; and
        a channel portion extending between the first mounting plate and the second mounting plate, wherein the channel portion comprises a channel comprising a void space bounded by a front wall, at least one rear wall, a first side wall extending rearward from the front wall toward the at least one rear wall and a second side wall extending rearward from the front wall toward the at least one rear wall, the at least one rear wall, and the first and second mounting plates being planar with each other;

attaching the post sleeve to an anchor channel of an edge angle using a fastener; and inserting a post into the channel.

13. The method of claim 12, wherein the post sleeve further comprises: a first slot configured to slidably secure a first shear tab; and a second slot configured to slidably secure a second shear tab, wherein the first and second slots are positioned on the post sleeve on opposite sides of the channel portion.

14. The method of claim 12 wherein attaching the post sleeve to an anchor channel of an edge angle using a fastener comprising using a first locking T-bolt through the first mounting hole and a second locking T-bolt through the second mounting hole, the first and second locking T-bolts each including a head having a first side mating with a first end via a first rounded surface and a second side mating with a second end via a second rounded surface.

15. The method of claim 14 wherein each locking T-bolt comprises:

the head comprising first and second ends each comprising respective locking grooves configured to lock the head of the locking T-bolt within the anchor channel; and a shank, wherein at least a portion of the shank is threaded.

16. The method of claim 12, further comprising:

securing the post within the channel using a post fastener.

17. A method comprising:

attaching two or more post sleeves to an anchor channel of an edge angle, wherein each respective post sleeve of the two or more post sleeves comprises:

a first respective mounting plate comprising a first respective mounting hole;

a second respective mounting plate comprising a second respective mounting hole; and a respective channel portion extending between the first respective mounting plate and the second respective mounting plate, wherein the respective channel portion comprises a void space bounded by a front wall, a first rear channel flange, a second rear channel flange, a first side wall extending rearward from the front wall to the first rear channel flange and a second side wall extending rearward from the front wall to the second rear channel flange; and wherein the attaching comprises securing the post sleeve to an anchor channel of an edge angle using a first locking T-bolt through the first mounting hole and a second locking T-bolt through the second mounting hole using locking T-bolts each including a head having a first side mating with a first end via a first rounded surface and a second side mating with a second end via a second rounded surface.

18. The method of claim 17, wherein:

wherein the each respective post sleeve of the two or more post sleeves further comprises:

a first respective slot; and a second respective slot; and the method further comprises:

attaching a first respective shear tab to the first respective slot of the each respective post sleeve of the two or more post sleeves; and attaching a second respective shear tab to the second respective slot of the each respective post sleeve of the two or more post sleeves.

19. The method of claim 18 further comprising:

securing a respective mullion of a curtain wall between the first respective shear tab and the second respective shear tab for the each respective post sleeve of the two or more post sleeves.

20. The method of claim 17 further comprising:

attaching the respective post to the each respective post sleeve of the two or more post sleeves; and connecting railing cables to respective railing attachments of the respective post attached to the each respective post sleeve of the two or more post sleeves.

\* \* \* \* \*